United States Patent [19]

Takizawa et al.

[11] Patent Number: 5,800,760

[45] Date of Patent: Sep. 1, 1998

[54] METHOD AND APPARATUS FOR CONTINUOUSLY MOLDING A FASTENING CONNECTOR

[75] Inventors: Toshiaki Takizawa; Mitsuru Akeno; Tsuyoshi Minato, all of Toyama, Japan

[73] Assignee: YKK Corporation, Tokyo, Japan

[21] Appl. No.: 714,306

[22] Filed: Sep. 18, 1996

[30] Foreign Application Priority Data

Sep. 25, 1995 [JP] Japan .................... 7-245700

[51] Int. Cl.$^6$ .................... B29C 47/32; B29C 39/18
[52] U.S. Cl. .................... 264/167; 264/172.19; 264/173.1; 425/115; 425/130
[58] Field of Search .................... 264/167, 166, 264/172.19, 173.1; 425/115, 130, 327, 363, 385

[56] References Cited

U.S. PATENT DOCUMENTS

| | | | |
|---|---|---|---|
| 3,590,109 | 6/1971 | Doleman et al. | 264/167 |
| 3,758,657 | 9/1973 | Menzin et al. | 264/166 |
| 4,673,383 | 6/1987 | Bentsen | 156/244.25 |
| 4,725,221 | 2/1988 | Blanz | 264/328.8 |
| 4,775,310 | 10/1988 | Fischer | 425/308 |
| 4,858,286 | 8/1989 | Siegel | 24/587 |
| 4,999,067 | 3/1991 | Erb et al. | 156/66 |
| 5,057,259 | 10/1991 | Parmelee | 264/166 |
| 5,393,475 | 2/1995 | Murasaki et al. | 264/167 |
| 5,441,687 | 8/1995 | Murasaki et al. | 264/167 |
| 5,512,234 | 4/1996 | Takizawa et al. | 264/167 |
| 5,607,635 | 3/1997 | Melbye et al. | 264/167 |
| 5,620,769 | 4/1997 | Wessels et al. | 264/167 |

FOREIGN PATENT DOCUMENTS

| | | |
|---|---|---|
| 0 575 828 A1 | 6/1993 | European Pat. Off. . |
| 0 661 007 A2 | 12/1994 | European Pat. Off. . |
| 1070971 | 2/1964 | United Kingdom . |
| 2 082 497 | 8/1981 | United Kingdom . |

*Primary Examiner*—Jan H. Silbaugh
*Assistant Examiner*—Mark Eashoo
*Attorney, Agent, or Firm*—Hill & Simpson

[57] ABSTRACT

A fastening connector of thermoplastic resin for connecting two separate members together is continuously molded efficiently in a single step by a simple method and apparatus. The method includes the steps of continuously extruding molten resin from an injection nozzle to the circumferential surface of a die wheel, which has in the circumferential surface, a multiplicity of engaging-element-forming cavities, to continuously mold a substrate sheet between the circumferential surface of the die wheel and the injection nozzle and a multiplicity of engaging elements in the engaging-element-forming cavities which elements stand on a front surface of the substrate sheet and, at the same time, to continuously mold at least one engaging ridge, through an engaging-ridge-molding channel, with part of the molten resin integrally with a rear surface of the substrate sheet.

15 Claims, 5 Drawing Sheets

METHOD AND APPARATUS FOR CONTINUOUSLY MOLDING A FASTENING CONNECTOR

BACKGROUND OF THE INVENTION

1. Field of the Invention

The invention relates to a method of and an apparatus for continuously molding a fastening connector of thermoplastic resin by continuous injection, which connector is to be used for connecting two members together, the fastening connector including a substrate sheet, a multiplicity of engaging elements standing on a front surface of the substrate sheet, and at least one continuous engaging ridge extending in the molding direction on a rear surface of the substrate sheet.

2. Description of the Related Art

Conventionally, a molded fastening connector for connecting two members is known which has a multiplicity of engaging elements standing on a front surface of a substrate sheet and at least one continuous engaging ridge extending longitudinally on a rear surface of the substrate sheet.

For example, the fastening connector may be used for joining a sheet-like member, such as a curtain and a window screen, with a frame. In such example, the fastening connector includes an elongated surface fastener member molded of synthetic resin material and a plurality of longitudinal and continuous engaging ridges extending parallel to one another and attached to the rear surface of the surface fastener member by an adhesive agent. The surface fastener member has a multiplicity of hook-shape engaging elements molded on the front surface of a substrate sheet. Each of the engaging ridges integraly adhered on the rear surface of the substrate sheet is in the form of a continuous projection of a generally T-shape cross section to be fitted in engaging groove of a generally T-shape cross section formed in a front surface of the frame. After the projection fitted in the engaging groove of the frame, the hook-shape engaging elements formed on the front surface of the fastening connector are brought into engagement with a multiplicity of loop-shape engaging elements of a companion surface fastener member attached to one edge of the sheet-like member, thus connecting the sheet-like member and the frame together.

Japanese Patent Laid-Open Publication No. Hei 7-148007 discloses a concept of molding a plurality of engaging ridges integrally with the rear surface of a surface fastener member simultaneously with the molding of the surface fastener member for using in mold-in-molding a cushion, such as of a car or an office chair. According to this molding method, in an extrusion molding die, a discharge opening having a cross section for molding the engaging ridges and communicating at one end with a discharge opening having a cross section for molding the surface fastener member is formed, and molten resin is extruded from each discharge openings and is then cooled in a cooling bath to mold a fastening connector blank having on respective surfaces of a substrate sheet a plurality of engaging-element ridges and a plurality of engaging ridges, both of a mushroom-shepe cross section. Then, the engaging-element ridges molded on the fastening connector blank are successively cut at a predetermined longitudinal pitch by a rotary cutter, whereupon the substrate sheet together with the engaging ridges are drawn longitudinally to form a predetermined space between adjacent engaging elements, thus obtaining a fastening connector as a final product.

In the conventional example in which a plurality of parallel longitudinal engaging ridges are attached to the rear surface of the surface fastener member by an adhesive agent, there are advantages that the resin of the engaging ridges may be hard material different from that of the surface fastener member, and that the thickness of the engaging ridges may be large irrespective of the thickness of the engaging elements of the surface fastener member. However, the conventional method requires, in addition to the step of molding the surface fastener member and the engaging ridges, the step of applying an adhesive agent over the rear surface of the surface fastener member and the step of attaching the engaging ridges to the rear surface of the surface fastener member, which would cause only a limited rate of production and inadequate degree of peeling strength between the surface fastener member and the engaging ridges.

In the fastening connector disclosed in Japanese Patent Laid-Open Publication No. Hei 7-148007, it is impossible to have a big difference in thickness between the engaging elements and the engaging ridges too far, and more particularly it is very difficult to mold large-thickness engaging ridges, which secure an anchor effect, simultaneously with the molding the engaging elements having a delicate structure, and it is impossible to mold the surface fastener member and the engaging ridges simultaneously using separate materials of different hardnesses. Further, since the engaging ridges and the substrate sheet have to be drawn longitudinally to manufacture the fastening connector, the substrate sheet and the engaging ridges are drawn too far locally between stem portions of adjacent engaging elements, they would have thick and thin portions alternately and hence become wavy or puckered so that the fastener connector is difficult to set correctly in the mold of the cushion.

SUMMARY OF THE INVENTION

It is therefore an object of this invention to provide a method of and an apparatus for continuously molding a fastening connector which is excellent in productivity, adequate in engaging strength and stable in shape, thus meeting various demands.

According to a first aspect of the invention, the above object is accomplished by a method of continuously molding a synthetic resin fastening connector which includes a substrate sheet, a multiplicity of engaging elements projecting from a front surface of the substrate sheet, and at least one continuous straight row of engaging ridge projecting from a rear surface of the substrate sheet. The method comprises the steps of: rotating in one way a die wheel having in its circumferential surface a multiplicity of engaging-element-forming cavities; continuously applying a predetermined width of molten resin onto the circumferential surface of the rotating die wheel under a predetermined resin pressure to fill the engaging-element-forming cavities with part of the molten resin, thereby molding the engaging elements and continuously molding the substrate sheet in a predetermined thickness with the remaining part of the molten resin simultaneously with the molding of the engaging elements; and applying part of the molten resin to at least one engaging-ridge-molding channel of a predetermined cross section facing the circumferential surface of the rotating die wheel to continuously mold the engaging ridge integrally with the rear surface of the substrate sheet simultaneously with the molding of the substrate sheet, or combining the engaging-ridge-forming molten resin, through at least one engaging-ridge-molding channel of a predetermined cross section, with a substrate-sheet-forming region disposed downstream in the direction of rotation of the rotating die wheel to continuously molding the engaging ridge integrally with the rear surface of the substrate sheet.

Preferably, the circumferential surface of the die wheel is positively cooled, and then the molded and cooled surface fastener member are drawn off the circumferential surface of the die wheel continuously.

According to a second aspect of the invention, the above object is accomplished by an apparatus for continuously molding a synthetic resin fastening connector which includes a substrate sheet, a multiplicity of engaging elements projecting from a front surface of the substrate sheet, and at least one continuous straight row of engaging ridge projecting from a rear surface of the substrate sheet. The apparatus comprises: a die wheel adapted to be driven for rotation in one way and having in its circumferential surface a multiplicity of engaging-element-forming cavities; and an injection nozzle disposed adjacent to the circumferential surface of the die wheel and having, in its arcuate surface adjacent to the circumferential surface of the die wheel, a molten resin outlet for integrally molding the substrate sheet and the engaging elements and a channel for molding the engaging ridge.

In one example, the channel communicates with a lower end of the outlet or is spaced downwardly from the outlet, and the outlet and the channel communicate with two separate branches, respectively, of a single sprue. In another example, the outlet and the channel communicate with their respective dedicated sprues. Further, if the molten resin outlet and the engaging-ridge-molding channel share part or whole of a single resin, it is preferable that the channel has throttle valve for regulating a quantity of resin.

In still another example, the sprues are connected to a single extruder via their respective dedicated gear pumps. And in a further example, the sprues are respectively connected to dedicated separate extruders via their respective dedicated gear pumps. In an additional example, the die wheel has a cooling means disposed inside for positively cooling the circumferential surface of the die wheel.

DETAILED DESCRIPTION OF THE PREFERRED EMBODIMENTS

Various preferred embodiments of this invention will now be described in detail with reference to the accompanying drawings.

Figure 1:
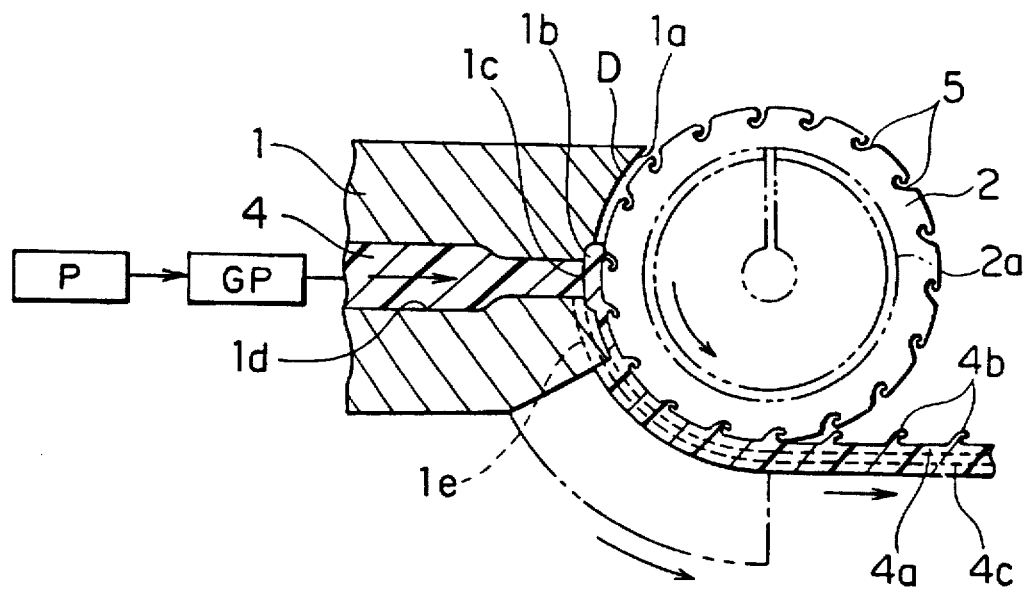
FIG. 1 is a fragmentary longitudinal cross-sectional view of a surface fastener member manufacturing apparatus for carrying out a method according to a first embodiment of this invention.
Figure 2:
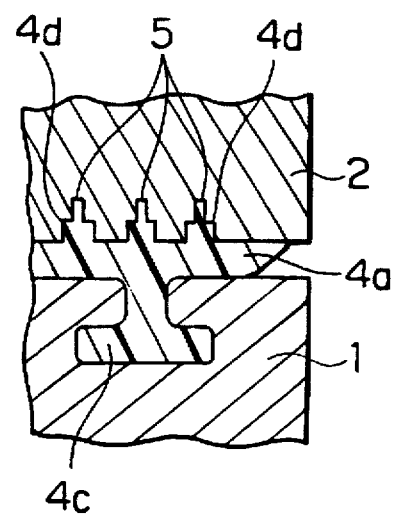
FIG. 2 is a vertical cross-sectional view showing an example of an engaging-ridge-forming channel of the apparatus.

FIG. 1 is a fragmentary longitudinal cross-sectional view showing a method of continuously molding a surface fastener member, as a fastening connector, according to a first embodiment of this invention. In this embodiment, engaging elements to be molded on the front surface of a substrate sheet are hooks of a surface fastener member. The shape of the engaging elements should by no means be limited to a hook shape and may be various other forms, such as a mushroom shape and a seed-leaf shape.

In FIG. 1, reference numeral 1 designates a continuous injection nozzle whose tip has an arcuate surface $1a$ of a curvature such as to define a predetermined gap with respect to a curved surface of a die wheel 2 described below. The injection nozzle 1 is a T-shape die having centrally in the arcuate surface $1a$ a molten resin reservoir $1b$ in the form of a generally parallelepiped having an outlet $1c$ from which molten resin 4 is to be continuously extruded into the molten resin reservoir $1b$ under a predetermined resin pressure by an extruder P via a gear pump GP to mold a substrate sheet and a multiplicity of hooks. In this embodiment, the injection nozzle 1 has a single central molten resin sprue $1d$.

As one of characteristic features of this invention, in the arcuate surface $1a$ at a position downwardly of the molten resin reservoir $1b$, there are disposed a plurality of parallel engaging-ridge-molding channel $1e$ extending in the arcuate direction. As shown partly in cross section, the channel $1e$ is a groove having a generally inverted T-shape cross section, thus communicating with a lower end of the outlet $1c$ and extending downstream in the direction of rotation of the die wheel 2.

The circumferential surface of the die wheel 2 is disposed in confronting relation to the arcuate surface $1a$ of the injection nozzle 1 with a predetermined gap D and has its axis parallel to the outlet $1c$. In the illustrated example, the die wheel 2 has in the circumferential surface a multiplicity of hook-forming cavities 5. The structure of the die wheel 2 is substantially identical with that disclosed in, for example, U.S. Pat. No. 4,775,310, and so it is described only briefly here. The die wheel 2 is in the form of a hollow drum having inside a water cooling jacket $2a$ and composed of a multiplicity of ring-shape plates placed along the center line one over another, each ring-shape plate having in its peripheral edges of front and rear surfaces a multiplicity of hook-forming cavities 5 with stem-forming cavity portions opening to the circumferential surface of the plate. The die wheel 2 of such structure is driven by a non-illustrated known synchronous drive unit for rotation in the direction shown by an arrow. In front of the die wheel 2, a non-illustrated vertical pair of take-up rollers is disposed for rotation in synchronism with the speed of rotation of the die wheel 2.

For molding a surface fastener member with an engaging ridge as the fastening connector on the apparatus, the molten resin 4 continuously injected from the injection nozzle 1 under a predetermined resin pressure is continuously forced into a gap between the injection nozzle 1 and the rotating die wheel 2 via the molten resin reservoir $1b$ to successively fill the hook-forming cavities 5 along the circumferential surface of the die wheel 2, thus molding a multiplicity of hooks $4b$ and, at the same time, molding a predetermined thickness of substrate sheet $4a$ integrally with the hooks $4b$.

Further, in this embodiment, simultaneously with molding of the substrate sheet $4a$, part of molten resin is applied over a rear or hook-free surface of the substrate sheet 4a via the engaging-ridge-molding channel 1e communicating with the molten resin reservoir 1b to mold a plurality of engaging ridges 4c integrally with the rear surface of the substrate sheet 4a.

Figure 3:
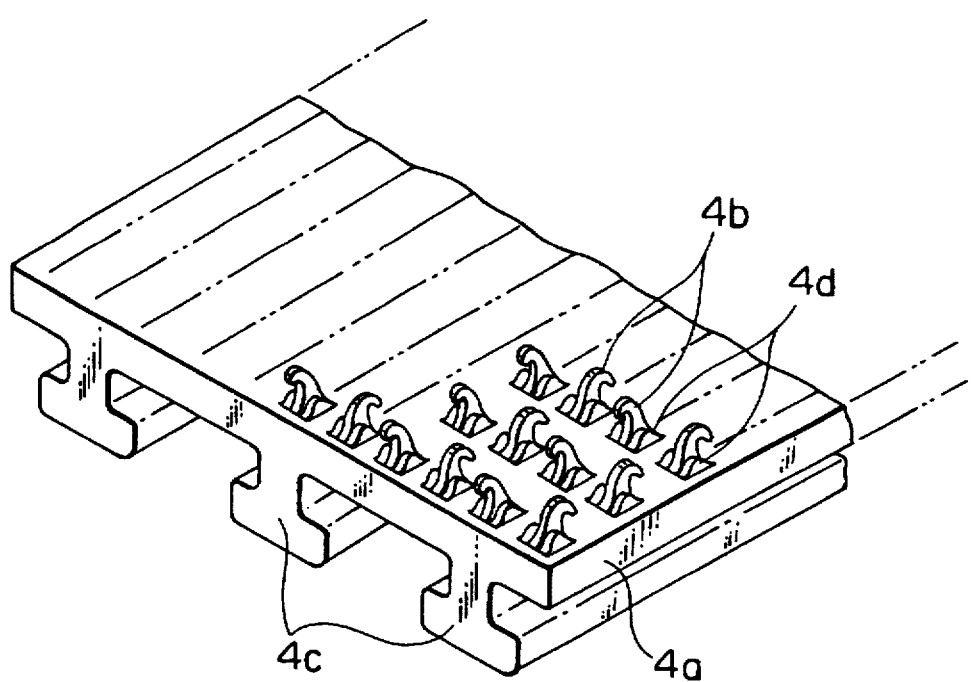
FIG. 3 is a fragmentary, enlarged perspective view showing one example of a surface fastener member manufactured by the method according to the first embodiment.

The molten resin 4 molded into the shape of a surface fastener member with the engaging ridges along the circumferential surface of the die wheel 2 is gradually solidified as cooled from inside of the die wheel 2 while revolving around substantially a quarter of the circumferential surface of the die wheel 2. When the substrate sheet 4a, together with the engaging ridges 4c, is positively drawn horizontally off the die wheel 2 by non-illustrated take-up rollers during this solidification, the individual hooks 4b in the cavities 5 are removed smoothly from the cavities 5 as they resiliently deform. Immediately after having been drawn from the die wheel 2, the deformed hooks 4b restore their original shape to be completely solidified and, as a result, a surface fastener member having the shape shown in FIG. 3 is molded.

In this embodiment, for peeling a molded resin product (a molded surface fastener member) off the die wheel 2, a vertical pair of take-up rollers oppositely rotating in synchronism with the rotation of the die wheel 2 is used. Although their circumferential surfaces may be smooth, the take-up rollers have in the circumferential surfaces a plurality of ring-shape grooves for receiving the rows of hooks 4b and the engaging ridges 4c so that the hooks 4b and the engaging ridges 4c are kept free from any damage during the drawing. The rotation of the take-up rollers is synchronized with the rotation of the die wheel 2 so that the hooks 4b can be removed smoothly from the hook-forming cavities 5.

Figure 4A:
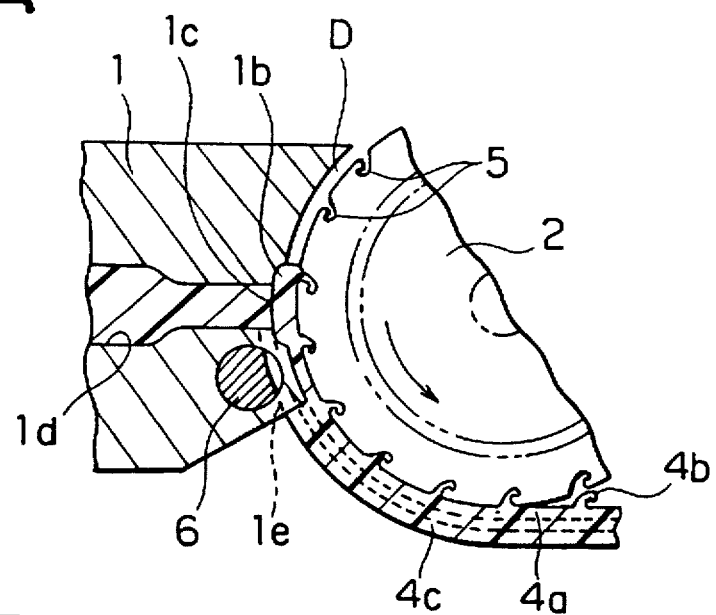
FIGS. 4(A) and 4(B) are fragmentary longitudinal cross-sectional views showing examples of a resin quantity regulator of a surface fastener member manufacturing apparatus for carrying out a method according to a second embodiment of this invention.
Figure 4B:
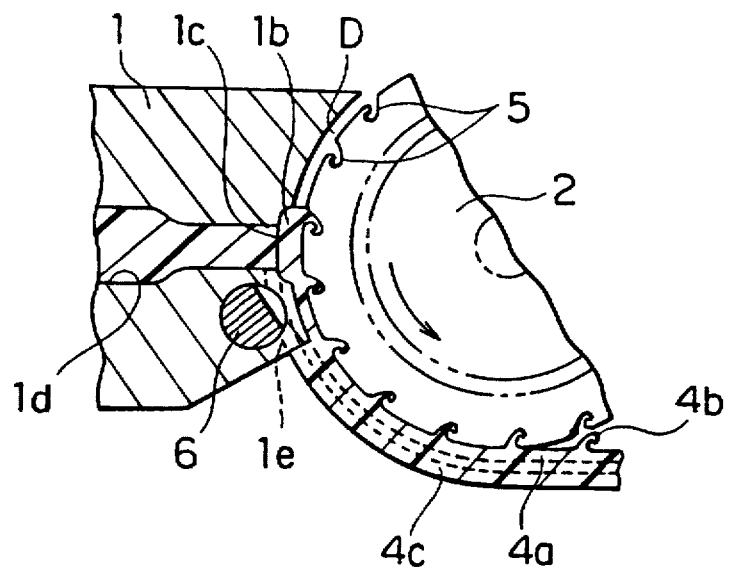

FIGS. 4(A) and 4(B) are fragmentary longitudinal cross-sectional views showing an apparatus for manufacturing a surface fastener member with engaging ridges for carrying out a method according to a second embodiment of this invention.

In this embodiment, the injection nozzle 1 has a regulator 6 for regulating a quantity of molten resin flowing in the engaging-ridge-molding channel 1e. According to the illustrated example, the regulator 6 is a cylindrical throttle valve, with part of the cylindrical surface of the valve being exposed to the engaging-ridge-molding channel 1e, and part of the exposed cylindrical surface being cut away. The throttle valve is rotatably mounted in the injection nozzle 1 for rotation about its axis parallel to the axis of the die wheel 2. FIG. 4(A) shows the regulator 6 in a fully open posture, and FIG. 4(B) shows the regulator 6 in a semi-open posture. The quantity of molten resin to flow in the engaging-ridge-molding channel 1e is adjusted according to the angle of rotation of the regulator 6, thereby rationalizing the distribution of resin quantity for molding the surface fastener member and the engaging ridges.

Figure 5:
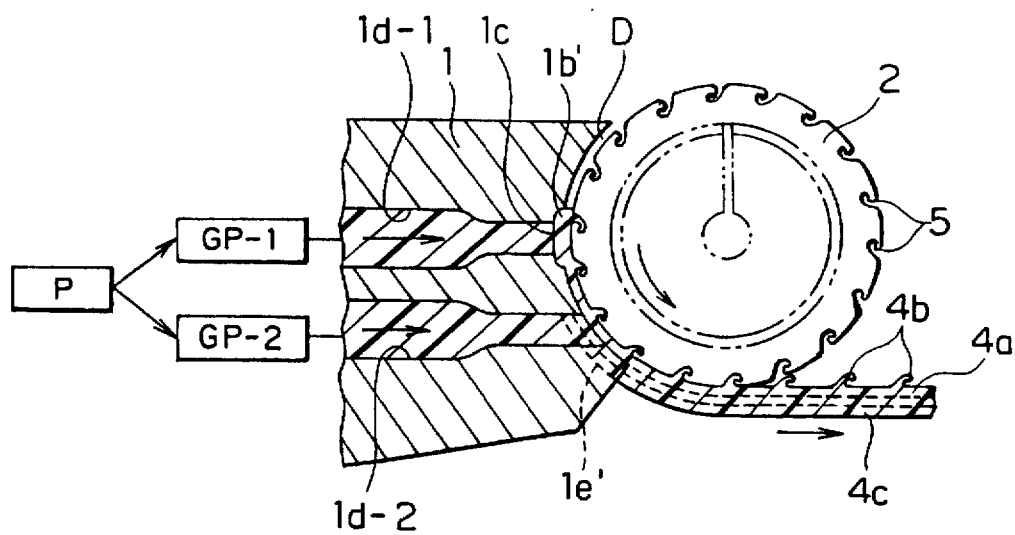
FIG. 5 is a fragmentary longitudinal cross-sectional view of a surface fastener member manufacturing apparatus for carrying out a method according to a third embodiment of this invention.

FIG. 5 is a fragmentary longitudinal cross-sectional view showing an apparatus for manufacturing a surface fastener member with engaging ridges for carrying out a method according to a third embodiment of this invention.

In this embodiment, a molten resin reservoir 1b and an engaging-ridge-molding channel 1e' in the arcuate surface 1a of the injection nozzle 1 are spaced vertically from each other, and the injection nozzle 1 has inside first and second separate sprues 1d-1, 1d-2 dedicated for molding a surface fastener member and engaging ridges, respectively, and communicating with the molten resin reservoir 1b' and the engaging-ridge-molding channel 1e', respectively. To the individual sprues 1d-1, 1d-2, molten resin extruded from the single extruder P is supplied under a predetermined resin pressure as regulated in resin flow by their respective dedicated gear pumps GP-1, GP-2. The engaging-ridge-molding channel 1e' of the second sprue 1d-2 is disposed downstream of the molten resin reservoir 1b' of the first sprue 1d-1 with respect to the circumferential surface of the die wheel 2, being defined directly at an opening of the second sprue 1d-2.

For molding a surface fastener member as the fastening connector on the apparatus of FIG. 5, molten resin 4 continuously injected from the injection nozzle 1 under a predetermined resin pressure is continuously forced into the gap D between the injection nozzle 1 and the rotating die wheel 2 via the molten resin reservoir 1b' to successively fill the hook-forming cavities 5 along the circumferential surface of the die wheel 2, thus molding the multiplicity of hooks 4b and, at the same time, molding the predetermined thickness of substrate sheet 4a integrally with the hooks 4b.

As the substrate sheet 4a and the hooks 4b are thus molded and revolve slightly through an angle in the downstream direction in response to the rotation of the die wheel 2, the molten resin to be extruded through the second sprue 1d-2 is molded into the engaging ridges 4c in the engaging-ridge-molding channel 1e' and, at the same time, is combined with the surface opposite to the surface with hooks of the substrate sheet 4a to be fused integrally. As a result, the surface fastener member having the plurality of engaging ridges 4c on its rear surface is continuously molded.

Figure 6:
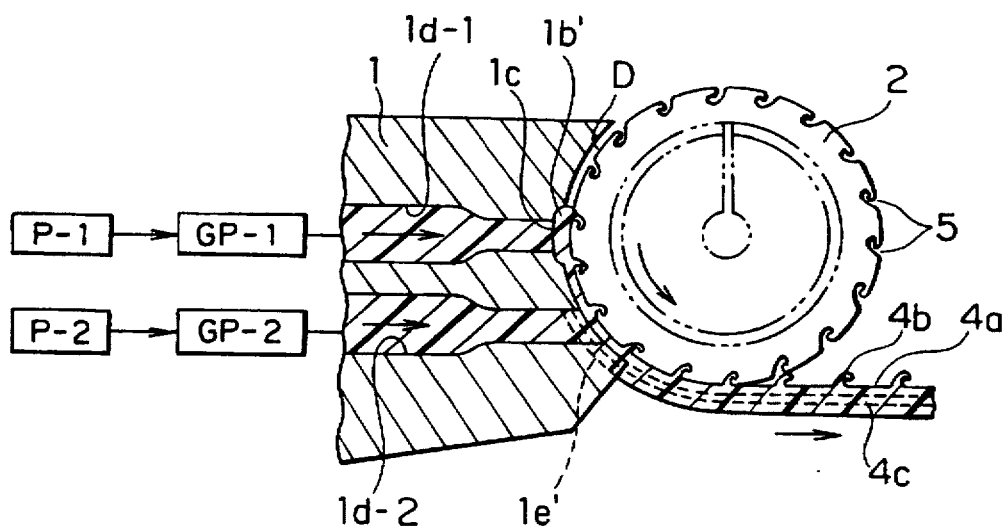
FIG. 6 is a fragmentary longitudinal cross-sectional view of a surface fastener member manufacturing apparatus for carrying out a method according to a fourth embodiment of this invention.

FIG. 6 is a fragmentary longitudinal cross-sectional view showing an apparatus for manufacturing a surface fastener member with engaging ridges for carrying out a method according to a fourth embodiment of this invention.

In this embodiment, like the third embodiment, the injection nozzle 1 has inside the first and second separate sprues 1d-1, 1d-2 dedicated for molding the surface fastener member and the plurality of engaging ridges, respectively. To the respective sprues 1d-1, 1d-2, the molten resin is supplied under a predetermined resin pressure as regulated in resin flow by their respective dedicated gear pumps GP-1, GP-2. The big difference of this embodiment from the third embodiment is that the apparatus has two separate extruders, i.e. a first extruder P-1 for molding the surface fastener member and a second extruder P-2 for molding the engaging ridges. Further, in this embodiment, like the third embodiment, the engaging-ridge-molding channel 1e' of the second sprue 1d-2 is spaced from the molten resin reservoir 1b' of the first sprue 1d-1 in the downstream direction with respect to the circumferential surface of the die wheel 2, being defined directly at the opening of the second sprue 1d-2.

In the fourth embodiment, with the two extruders P-1, P-2 respectively dedicated for the surface-fastener-member molding and the engaging-ridge molding, it is possible to supply different resin materials to the respective extruders P-1, P-2. Although generally a certain degree of softness is required in both a substrate sheet 4a and hooks 4b of the surface fastener member, the engaging ridge 4c must have a certain degree of hardness and rigidness when it is to be firmly fitted in engaging grooves as of a curtain rail. In the fourth embodiment, it is possible to throw soft synthetic resin material into the first extruder P-1 and, in the meantime, hard synthetic resin material into the second extruder P-2 and to regulate the respective molten resin quantities to the optimum by the corresponding gear pumps GP-1, GP-2 associated with the respective sprues 1d-1, 1d-2.

Figure 7:
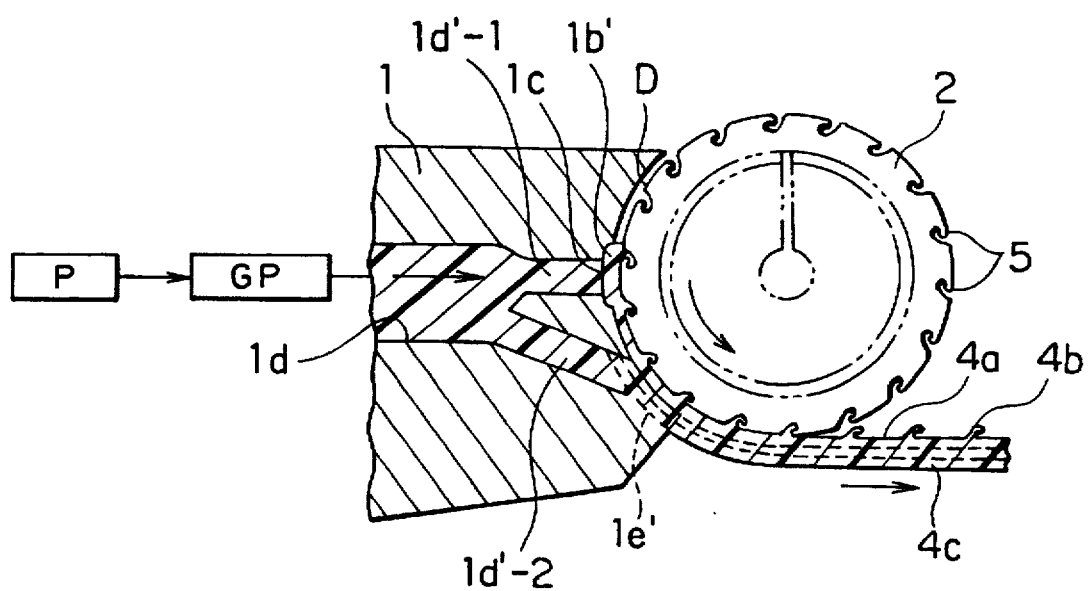
FIG. 7 is a fragmentary longitudinal cross-sectional view of a surface fastener member manufacturing apparatus for carrying out a method according to a fifth embodiment of this invention.

FIG. 7 is a fragmentary longitudinal cross-sectional view showing an apparatus for manufacturing a surface fastener member with engaging ridges according to a fifth embodiment of this invention.

In this embodiment, like the first and second embodiments, the injection nozzle 1 has the single sprue 1d whose outlet 1c is shared by the molten resin reservoir 1b40 and the engaging-ridge-molding channel 1e', which are spaced vertically from each other. The molten resin sprue 1d is branched into two subdivided sprues 1d'-1, 1d'-2 whose respective openings communicate with the molten resin reservoir 1b'-1 and the engaging-ridge-molding channel 1e'. The cross-sectional areas of the two sprue branches 1d'-1, 1d'-2 are set to an area ratio in conformity with a ratio between the quantity of resin for molding the substrate sheet 4a and the hooks 4b and the quantity of resin for molding the engaging ridges 4c.

As indicated in phantom lines in FIG. 1, in the injection nozzle 1, the arcuate surface 1a of its tip may be extended to a position perpendicularly below the axis of the die wheel 2. In such example, since the engaging-ridge-molding channel 1e also is necessarily extended to the same position, the engaging ridges 4c molded in the channel 1e are substantially completely cooled until they are discharged outside the extended portion. Accordingly it is possible to mold the engaging ridges 4c integrally with the substrate sheet 4a and to stabilize the engaging ridges 4c in shape.

Not only in the embodiment of FIG. 1 but also in other embodiments, the arcuate surface 1a of tip of the injection nozzle 1 can be thus extended by adopting the same construction.

Further, in each of the foregoing embodiments, each hook 4d has a pair of reinforcing ribs 4b one on each of opposite side surfaces; the hooks 4b in the same row are oriented in a common direction, while the hooks 4b in adjacent rows are oriented in opposite directions. Although the ribs 4d may be omitted, the ribs 4d serve to prevent the hook 4b from falling flat sideways. Further, the orientation of the hooks 4b adjacent in the row may be reversed so that a surface fastener member having no directivity in engaging force can be obtained. This invention should by no means be limited to the illustrated examples, and various modifications may be suggested within the scope of this disclosed inventive concept.

As is apparent from the foregoing detailed description, according to the molding method and apparatus of this invention, partly since a multiplicity engaging elements 4b and one or more engaging ridges 4c can be continuously molded on the front and rear surfaces, respectively, of a substrate sheet 4a in a single step, and partly since the cross-sectional shape of the engaging-ridge-molding channel 1e may be set as desired, it is possible to increase the thickness of the engaging ridges 4c remarkably than that of the engaging elements 4b and the substrate sheet 4a. Further, in the example in which the injection nozzle 1 has two separate sprues 1d-1, 1d-2 dedicated for molding the substrate sheet 4a and the engaging elements 4b and for molding the engaging ridges 4c and in which two separate extruders P-1, P-2 are associated with the corresponding sprues 1d-1, 1d-2, it is possible to select different resin materials for molding the substrate sheet 4a and the engaging elements 4b and for molding the engaging ridges 4c, and for example, resin materials different in hardness can be used at the same time.

What is claimed is:

1. A method of continuously molding a unitary synthetic resin fastening connector which includes a substrate sheet, a multiplicity of engaging elements projecting from a front surface of the substrate sheet, and at least one continuous straight row of engaging ridge projecting from a rear surface of the substrate sheet and extending longitudinally along the rear surface of the substrate, said method comprising the steps of:

(a) rotating in one direction a die wheel having in its circumferential surface a multiplicity of engaging-element-forming cavities;

(b) continuously applying a predetermined width of molten resin onto the circumferential surface of the rotating die wheel under a predetermined resin pressure to fill said engaging-element-forming cavities with a first portion of said molten resin, thereby molding the engaging elements and continuously molding the substrate sheet in a predetermined thickness with a second portion of said molten resin simultaneously with the molding of the engaging elements; and (c) applying a third portion of said molten resin to at least one engaging-ridge-molding channel of a predetermined cross section facing the circumferential surface of the rotating die wheel to continuously mold the engaging ridge integrally with the rear surface of the substrate sheet and simultaneously with the molding of the substrate sheet.

2. A fastening connector molding method according to claim 1, further including the steps of positively cooling the circumferential surface of the die wheel, and continuously drawing the molded and cooled fastening connector off the circumferential surface of the die wheel.

3. The method of claim 1 wherein the engaging ridge comprises a T-shaped cross section comprising a vertical wall that extends downward from the rear surface of the substrate and terminates at a central portion of a horizontal wall.

4. A method of continuously molding a unitary synthetic resin fastening connector which includes a substrate sheet, a multiplicity of engaging elements projecting from a front surface of the substrate sheet, and at least one continuous straight row of engaging ridge projecting from a rear surface of the substrate sheet and extending longitudinally along the substrate, said method comprising the steps of:

(a) rotating in one direction a die wheel having in its circumferential surface a multiplicity of engaging-element-forming cavities;

(b) continuously applying a predetermined width of a first supply of molten resin onto the circumferential surface of the rotating die wheel under a predetermined resin pressure at a substrate-sheet-forming region to fill said engaging-element-forming cavities with a first portion of said molten resin, thereby molding the engaging elements and continuously molding the substrate sheet in a predetermined thickness with a second portion of said molten resin simultaneously with the molding of the engaging elements; and (c) combining an engaging-ridge-forming molten resin with said first supply of molten resin by injecting said engaging-ridge-forming molten resin through at least one engaging-ridge-molding channel of a predetermined cross section downstream from said substrate-sheet-forming region and in the direction of rotation of the rotating die wheel thereby continuously molding the engaging ridge integrally with the rear surface of the substrate sheet.

5. A fastening connector molding method according to claim 4, further including the steps of positively cooling the circumferential surface of the die wheel, and continuously drawing the molded and cooled fastening connector off the circumferential surface of the die wheel.

6. The method of claim 4 wherein the engaging ridge comprises a T-shaped cross section comprising a vertical wall that extends downward from the rear surface of the substrate and terminates at a central portion of a horizontal wall.

7. An apparatus for continuously molding a unitary synthetic resin fastening connector which includes a substrate sheet, a multiplicity of engaging elements projecting from a front surface of the substrate sheet, and at least one continuous straight row of engaging ridge projecting from a rear surface of the substrate sheet and extending longitudinally along the rear surface of the substrate, said apparatus comprising:
  (a) a die wheel adapted to be driven for rotation in one direction and having in its circumferential surface a multiplicity of engaging-element-forming cavities; and
  (b) a continuous injection nozzle extending towards and disposed adjacent to the circumferential surface of said die wheel and having an outlet that leads into a recessed area forming a reservoir disposed adjacent to the circumferential surface of said die wheel, the continuous injection nozzle further comprising an en raging-ridge-molding channel that extends arcuately downward in a tangential relationship to the circumferential surface of the die wheel, the continuous injection nozzle for injecting molten resin through the outlet, into the reservoir against the die wheel and into the engaging a-ridge-molding channel thereby integrally molding the substrate sheet, the engaging elements and the engaging ridge.

8. A fastening connector molding apparatus according to claim 7, wherein said engaging-ridge-molding channel communicates with the reservoir of the continuous injection nozzle.

9. A fastening connector molding apparatus according to claim 7, wherein said outlet and said engaging-ridge-molding channel communicate with a single sprue through two separate branches.

10. A fastening connector molding apparatus according to claim 8 or 9, wherein said engaging-ridge-molding channel has a throttle valve.

11. A fastening connector molding apparatus according to claim 7, wherein said engaging-ridge-molding channel is spaced downwardly from the outlet.

12. A fastening connector molding apparatus according to claim 11, wherein said outlet is in communication with a first dedicated sprue and said engaging-ridge-molding channel is in communication with a second dedicated sprue.

13. A fastening connector molding apparatus according to claim 12, wherein said first dedicated sprue is connected to a single extruder via a first dedicated gear pump and the second dedicated sprue is connected to the single extruder via a second dedicated gear pump.

14. A fastening connector molding apparatus according to claim 12, wherein said first and second dedicated sprues are respectively connected to dedicated separate first and second extruders via respective first and second dedicated gear pumps.

15. A fastening connector molding apparatus according to claim 7, wherein said die wheel has a cooling means disposed inside for positively cooling the circumferential surface of said die wheel.

* * * * *